United States Patent [19]

Newhall et al.

[11] Patent Number: 5,094,860

[45] Date of Patent: Mar. 10, 1992

[54] PROCESS FOR THE AROMATIZATION OF DRY VEGETABLE MATTER

[75] Inventors: Ralph P. Newhall; Ronald A. Voyton, both of Princeton, N.J.

[73] Assignee: Firmenich SA, Geneva, Switzerland

[21] Appl. No.: 657,928

[22] Filed: Feb. 20, 1991

[51] Int. Cl.$^5$ .............................. A23F 3/34; A23L 1/22
[52] U.S. Cl. ..................................... 426/78; 426/273; 426/289; 426/597; 426/638; 426/640
[58] Field of Search ................ 426/597, 638, 77, 78, 426/84, 273, 102, 289, 79, 285, 640

[56] References Cited

U.S. PATENT DOCUMENTS

| | | | |
|---|---|---|---|
| 2,137,243 | 11/1938 | Heyman | 426/78 |
| 3,914,439 | 10/1975 | Graves | 426/78 |
| 3,989,852 | 11/1976 | Palmer | 426/289 |
| 4,534,983 | 8/1985 | Koene | 426/597 |
| 4,576,826 | 3/1986 | Liu | 426/289 |
| 4,710,391 | 12/1987 | Kirn | 426/289 |
| 4,756,915 | 7/1988 | Dobry | 426/84 |
| 4,880,649 | 11/1989 | Holzner | 426/102 |

FOREIGN PATENT DOCUMENTS

| | | | |
|---|---|---|---|
| 0284790 | 10/1988 | European Pat. Off. | 426/77 |
| 658780 | 12/1986 | Fed. Rep. of Germany | 426/77 |
| 49-4373 | 1/1974 | Japan | 426/77 |
| 6616898 | 6/1967 | Netherlands | 426/78 |

*Primary Examiner*—Carolyn Paden
*Attorney, Agent, or Firm*—Pennie & Edmonds

[57] ABSTRACT

Process for the aromatization of dry comminuted vegetable matter wherein particulated micro-encapsulated flavor is intimately mixed with a fat, an oil and/or an emulsifier till its particles reach by adhering to each other a mean size of at least 150 μm and the resulting product is added to the dry comminuted vegetable matter.

16 Claims, No Drawings

PROCESS FOR THE AROMATIZATION OF DRY VEGETABLE MATTER

BRIEF SUMMARY OF THE INVENTION

The present invention provides a process for the aromatization of dry comminuted vegetable matter by means of at least one microencapsulated flavour, which process comprises intimately mixing a particulated micro-encapsulated flavour with a fat or an oil and/or an emulsifier in such a proportion that the particles of the micro-encapsulated flavour adheres to each other, continuing the mixing operation till the mean size of the said particles reaches at least 150 μm, and then adding the obtained product to the comminuted dry vegetable matter.

BACKGROUND OF THE INVENTION

It has become a common practice to flavour tea, herbs and tobacco in order to increase their attractiveness. In recent years, the growing demand for aromatized tea for instance is partly due to the attraction felt by the consumer for non-traditional tea-based drinks such as soluble tea, iced-tea, various liquid mixtures ready for consumption or carbonated drinks, which are on offer in various forms, in bottles, cans or cartons.

Traditionally, tea has been flavoured by adding certain essential oils, e.g. jasmin, rose or bergamot essence, or spices such as cinnamon, cardamom or mint or fruit flavours, e.g. strawberry, peach, banana or grape. On the other hand, tea acquires its characteristic aroma during the various stages of maturing and packaging. Withering and curling of leaves, fermentation and drying are other operations which modify the original taste and flavour of tea and which, like the nature of the soil and climatic conditions of the place where the plant is cultivated, determine its aromatic characteristics.

Although systematic studies have not been made, experience has shown that prolonged storage of tea leaves after fermentation destroys the aroma, and hence there is a need for flavouring.

Usually, flavouring is done simply by spraying the flavour in solution in an inert edible solvent onto the leaves, or by mixing the leaves with solid particles containing the flavouring, in which case the technique of micro-encapsulation of the "fluidised bed" process is employed [see e.g. European patent application 70719 published on Jan. 26, 1983]. However, these methods have serious disadvantages. Firstly, the method of spraying a solution of flavouring is inefficient in that the dispersed flavouring tends to evaporate from the surface of the treated leaves in a relatively short time, a disadvantage which has been addressed by U.S. Pat. No. 4,880,649 to Firmenich.

On the other hand, the method using solid flavoured capsules is inconvenient in operation since it has been found that the particles tend to separate by gravity from the mass of leaves and accumulate at the bottom of the vessel in which they are stored or transported. Besides, when tea leaves are flavoured by this latter method and the resulting product is intended to be used for the manufacture of tea bags, the added flavour granules separate from the leaves and tend to sift through the walls of the bags. In both cases, the flavouring is non-uniform.

The same sort of considerations applies to the flavouring of dry vegetable matter other than tea, for instance cut tobacco and minced vegetables, herbs and spices. In all these products, granules of flavour tend to separate from the vegetable particles and hence render the packaging of the flavoured material subject to lack of uniformity.

Micro-encapsulated flavours are extensively used in the food industry. Their preparation is widely known [see e.g. L. L. Balassa and G. O. Fanger in CRC Critical Reviews in Food Technology, July 1971, pp. 245-264]. However, their utilization for the flavouring of dry vegetable materials is hampered for the above given reasons. The present invention provides a simple and efficient solution to the problem of flavouring uniformly comminuted vegetable matter.

PREFERRED EMBODIMENTS OF THE INVENTION

The process of the invention consists in intimately mixing a particulated micro-encapsulated flavour with a fat or an oil and/or an emulsifier in such a proportion that the particles of the micro-encapsulated flavour adheres to each other, in continuing the mixing operation till the mean size of the said particles reaches at least 150 μm, and in adding the obtained product to the comminuted dry vegetable matter.

The process of the invention can be applied to a variety of vegetable matters, but more particularly to tea, spices and herbs, in addition to tobacco. More particularly, the process of the invention finds a useful application in the conditioning of tea leaves or herbs in general prior to packaging in ready-to-use bags, namely destined to the preparation of infusions or decoctions.

By the simple process of the invention, we have surprisingly found that the size of the particles consisting of micro-encapsulated flavour could be increased to such an extent that the sifting through the walls of the bags, generally of cellulosic nature, was practically entirely suppressed. The main disadvantage presented by the use of micro-encapsulated flavour in tea aromatization, for example, was successfully overcome.

We have established that a mean size of at least about 150 μm in diameter of the particles could prevent the sifting. This value guarantees a satisfactory implementation of the process of the invention for most of the practical applications known so far.

In order to achieve this result, the micro-encapsulated flavour is thoroughly mixed with a fat or an oil and/or an emulsifier. Suitable oils consist of food grade fatty acid esters of glycerol, eminently of natural origin. We have found that peanut oil provides the suitable proper characteristics and possesses the viscosity so as to render the process easy to put into practice without the use of special apparatus. Of course, other vegetable oils or fat of animal origin, e.g. coconut fat, butter or beef fat, can be used instead. The limitation for their use in the process of the invention is their inherent taste and aroma, their physical appearance, namely their viscosity and their cost, in addition of course to the legal status concerning their utilization in a food product.

Suitable emulsifiers include fatty acid esters of poly-(oxyethylene)-sorbitan, more particularly esters of oleic or lauric acid. Thus, preferred emulsifiers include laurate or oleate of poly(oxyethylene)-sorbitan.

The use of fats, oils and emulsifiers can occur separately. However, it is also possible to use mixtures of fat or oils with emulsifiers.

The proportions of fat, oil and/or emulsifier as used in accordance with the present invention vary in a wide range. Typically, we have found that satisfactory results can be obtained with proportions of at least about 0.25 parts by weight per 100 parts of micro-encapsulated flavour. The upper level of this range is dictated particularly by the capacity of the fat, oil or emulsifier to promote cohesiveness between the micro-particles of the flavour. Concentrations higher than the above given value, for example up to 10%, have been successfully used.

For obvious aesthetic considerations, the concentration of the fats or oils versus the micro-encapsulated flavour is dependent on the ability of the resulting product to form oil in water emulsion when the resulting flavour is used, in conjunction with the dry vegetable matter, in the preparation of infusions or decoctions in simmering water.

The mixing process, which results in practice in the coating of the flavour particles, is effected very simply by any current known mixing method. To this end, a ribbon blender, a V blender or a Hobart type mixer can be used. The chosen fat, oil or emulsifier can be poured or sprayed on the flavour powder before or during the mixing process.

The obtained premix of micro-encapsulated flavour of increased size is then added to the mass of vegetable matter, consisting of dry pieces of tea leaves, herbs or the like, and eventually the resulting product is thoroughly mixed until a homogeneous material is obtained. The proportions of micro-encapsulated flavour is dependent on the strength of flavour itself and of course on the solubility of the ingredients for the intended use. The expert in the art knows by experience how to adapt the level of the flavour concentration so as to obtain the most satisfactory results in terms of flavour balance and hedonic appreciation.

As explained above, the process of the invention represents an economic alternative to the preparation of larger size particles of micro-encapsulated flavour which so far were obtained by more complex processes.

The invention is illustrated by but not limited to the following examples.

EXAMPLE 1

Two different micro-encapsulated flavour powders, A and B, prepared in accordance with current techniques and by spray-drying the liquid flavour on a maltodextrin support, were consistently used for all experimental essays described in this and the following examples.

Flavours A and B were preliminary subjected to sieving by using a rotating sieve shaker [model: Gilson Sieve Shaker, SS8R with 8-inch round sieves]. With a 150 μm sieve, flavour A was retained on the sieve in a proportion of 64.9%, while 35.1% of the granules passed through. For flavour B, these proportions were of 23.5% and 76.5%, respectively.

Peanut oil was mixed thoroughly with samples of flavour A and flavour B in respective proportions of 0.25%, 1.0%, 5.0% and 10.0%.

0.25 g of each of the resulting flavoured powders were added on top of 2.20 g of tea leaves placed within a tea bag without mixing.

Each tea bag was sealed and tested for flavour powder penetration by placing the tea bag on a 150 μm sieve and mechanically rotated for 10 min to simulate transport and handling.

The results obtained are summarized in the following tables.

| flavoured tea fines | unaltered | coated with peanut oil [%] | | | |
|---|---|---|---|---|---|
| | | 0.25 | 1.00 | 5.00 | 10.00 |
| Flavour A | | | | | |
| grams on a 150 μm sieve | trace | none | none | none | none |
| grams through a 150 μm sieve | 0.035 | 0.004 | none | none | none |
| Flavour B | | | | | |
| grams on a 150 μm sieve | 0.009 | trace | trace | none | none |
| grams through a 150 μm sieve | 0.098 | 0.071 | 0.033 | 0.002 | none |

EXAMPLE 2

0.25 g of the flavour powder coated with peanut oil as described in Example 1 were blended with 2.20 g of tea leaves.

2.45 g samples of the resulting mixtures were placed in tea bags and tested for flavour powder penetration according to the method described in Example 1.

| flavoured tea fines | unaltered | coated with peanut oil [%] | | | |
|---|---|---|---|---|---|
| | | 0.25 | 1.00 | 5.00 | 10.00 |
| Flavour A | | | | | |
| grams on a 150 μm sieve | trace | trace | none | none | none |
| grams through a 150 μm sieve | 0.019 | 0.001 | none | none | none |
| Flavour B | | | | | |
| grams on a 150 μm sieve | 0.009 | trace | none | none | none |
| grams through a 150 μm sieve | 0.111 | 0.064 | 0.025 | 0.002 | trace |

EXAMPLE 3

Polysorbate 80 [origin: ICI Americas Inc., Tween ®80], a non-ionic emulsifier, having a viscosity of about 450 cps, at 25° C., was added to samples of flavour A and B (see Example 1) in respective proportions of 0.10%, 0.25%, 1.0%, 5.0% and 10.0%.

The coated flavour powders were premixed with tea leaves at a concentration of 0.25 g for 2.20 g of tea leaves. 2.45 g samples of the resulting flavoured tea leaves were placed in tea bags as described in the previous examples and tested for flavour powder penetration through the walls of bag.

| flavoured tea fines | unaltered | coated with Polysorbate [%] | | | | |
|---|---|---|---|---|---|---|
| | | 0.10 | 0.25 | 1.00 | 5.00 | 10.00 |
| Flavour A | | | | | | |
| grams on a 150 μm sieve | trace | none | none | none | none | none |
| grams through a 150 μm sieve | 0.020 | trace | none | none | none | none |
| Flavour B | | | | | | |
| grams on a 150 μm sieve | 0.001 | trace | trace | none | none | none |
| grams through a 150 μm sieve | 0.090 | 0.070 | 0.054 | 0.018 | trace | none |

EXAMPLE 4

5 parts of Polysorbate 80 were mixed with 95 parts of tea leaves until tea leaves were uniformly coated.

1 part of flavour powder A and B was added separately to 9 parts of the coated tea leaves and the mixture was mechanically rotated until the flavour particles were uniformly dispersed.

2.45 g samples of the flavoured tea mix were placed in bags and tested as described in the previous examples for flavour powder penetration through the bag.

| flavoured tea fines | unaltered | coated with Polysorbate 80 |
|---|---|---|
| Flavour A | | |
| grams on a 150 μm sieve | trace | none |
| grams through a 150 μm sieve | 0.050 | none |
| Flavour B | | |
| grams on a 150 μm sieve | trace | none |
| grams through a 150 μm sieve | 0.150 | none |

EXAMPLE 5

A micro-encapsulated flavour powder, C, has been prepared as indicated in Example 1 by spray drying on a maltodextrin support. Flavour was sujected to sieving as indicated in Example 1. The flavour passed completely through a 150 μm sieve. It was then coated with peanut oil and then added in a proportion of 0.25 g to 2.20 g of tea leaves placed within tea bags. Each tea bag was sealed and tested for flavour powder penetration by placing the tea bags on a 150 μm sieve and mechanically rotated for 10 min to simulate transport and handling. The results obtained are summarized in the following table.

| flavoured tea fines | Flavour C | | | | |
|---|---|---|---|---|---|
| | unaltered | coated with peanut oil [%] | | | |
| | | 5.00 | 10.00 | 15.00 | 20.00 |
| grams on a 150 μm sieve | trace | none | none | none | none |
| grams through a 150 μm sieve | 0.169 | 0.011 | 0.006 | trace | none |

By replacing peanut oil by Polysorbate 80 in the same proportions, the following results were observed.

| grams on a 150 μm sieve | trace | none | none | none | none |
|---|---|---|---|---|---|
| grams through a 150 μm sieve | 0.170 | 0.001 | trace | none | none |

What we claim is:

1. A process for the aromatization of dry comminuted vegetable matter by means of at least one micro-encapsulated flavour, which comprises intimately mixing a particulated micro-encapsulated flavour with a fat, an oil or an emulsifier in such proportion that the particles of the micro-encapsulated flavour adheres to each other, continuing the mixing operation till the mean size of the said particles reaches at least 150 μm, and then adding the obtained product to the comminuted dry vegetable matter.

2. The process of claim 1, wherein the dry vegetable matter is selected from the group consisting of tea, spices and herbs.

3. The process of claim 1, wherein the oil is peanut oil.

4. The process of claim 3, wherein the proportion of peanut oil is of at least about 0.25 parts by weight per 100 parts of micro-encapsulated flavour.

5. The process of claim 1, wherein the emulsifier is a fatty acid ester of poly(oxyethylene)-sorbitan.

6. The process of claim 4, wherein the emulsifier is laurate or oleate of poly(oxyethylene)-sorbitan.

7. The process of claim 5, wherein the proportion of emulsifier is of at least about 0.10 parts by weight per 100 parts of micro-encapsulated flavour.

8. The process of claim 1, wherein the proportion of micro-encapsulated flavour is of about 10 parts by weight per 100 parts of dry vegetable matter.

9. A process for the aromatization of dry comminuted vegetable matter by means of at least one micro-encapsulated flavor, which comprises intimately mixing a particulated micro-encapsulated flavor with an emulsifier and a fat or an oil in such a proportion that the particles of the micro-encapsulated flavor adheres to each other, continuing the mixing operation till the mean size of the said particles reaches at least 150 μm, and then adding the obtained product to the comminuted dry vegetable matter.

10. The process of claim 9, wherein the dry vegetable matter is selected from the group consisting of tea, spices and herbs.

11. The process of claim 10, wherein the oil is peanut oil.

12. The process of claim 11, wherein the proportion of peanut oil is of at least about 0.25 parts by weight per 100 parts of micro-encapsulated flavor.

13. The process of claim 9, wherein the emulsifier is a fatty acid ester of poly(oxyethylene)-sorbitan.

14. The process of claim 13, wherein the emulsifier is laurate or oleate of poly(oxyethylene)-sorbitan.

15. The process of claim 13, wherein the proportion of emulsifier is of at least about 0.10 parts by weight per 100 parts of micro-encapsulated flavor.

16. The process of claim 9, wherein the proportion of micro-encapsulated flavor is of about 10 parts by weight per 100 parts of dry vegetable matter.